United States Patent Office 3,510,782
Patented May 5, 1970

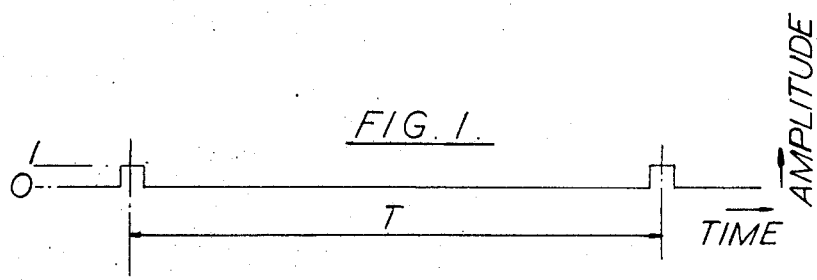
FIG. 1.
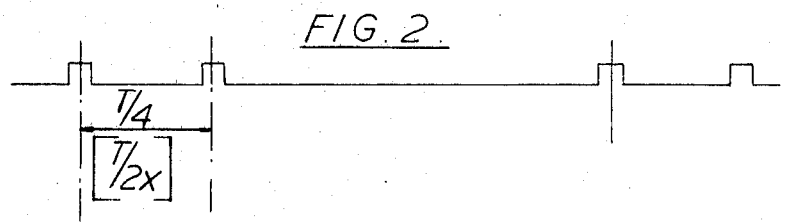
FIG. 2.
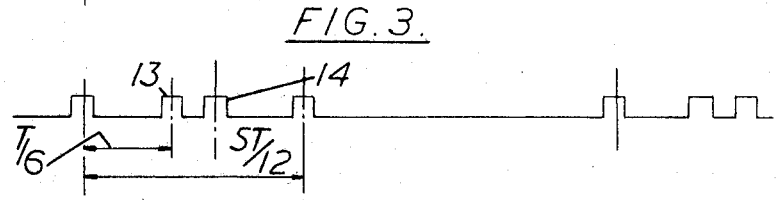
FIG. 3.
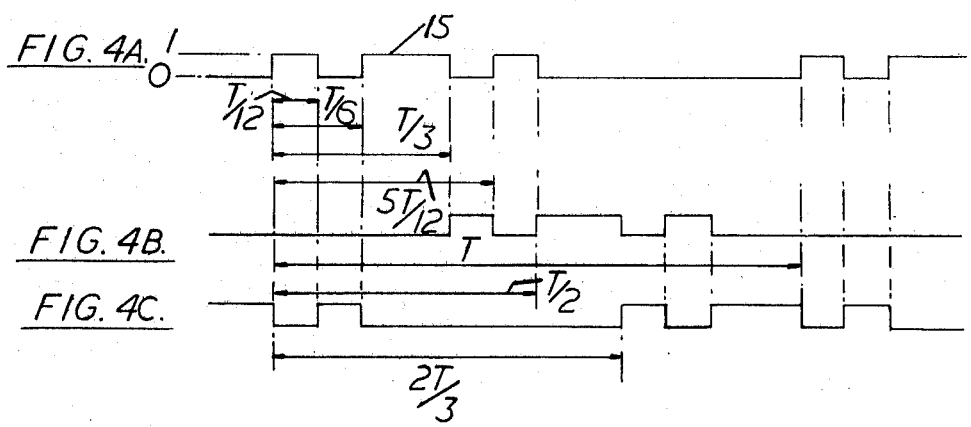
FIG. 4A.
FIG. 4B.
FIG. 4C.

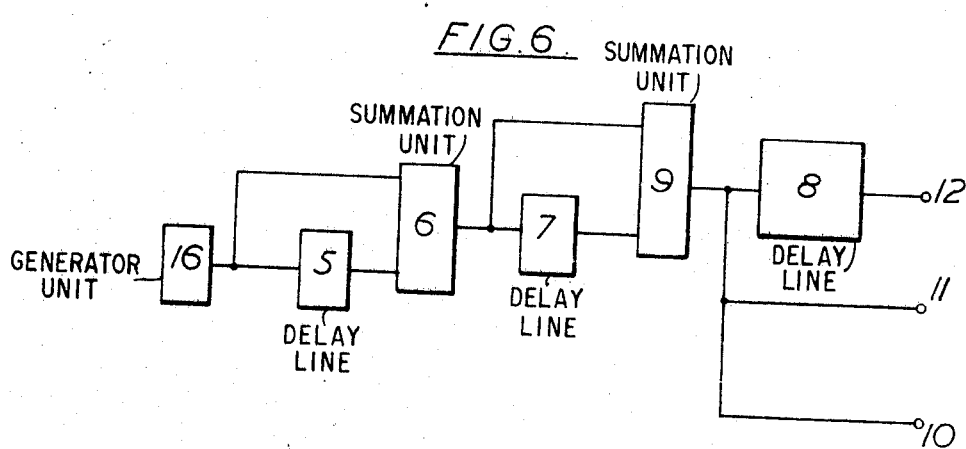
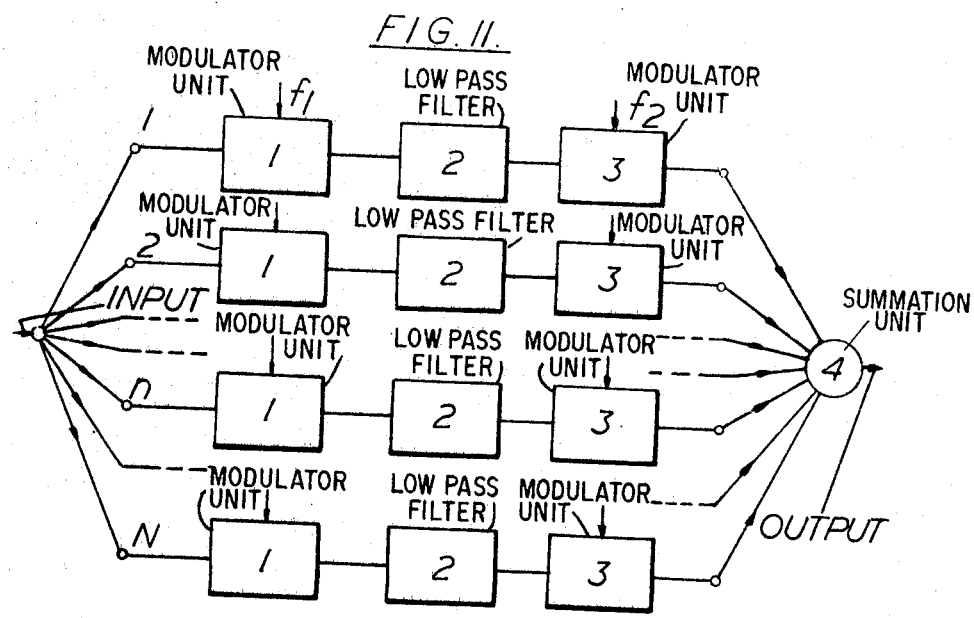

3,510,782
DIGITAL WAVEFORM GENERATOR
Frank Ralph, Bishop's Stortford, and Michael John Gingell, Harlow, England, assignors to International Standard Electric Corporation
Filed June 1, 1967, Ser. No. 642,855
Claims priority, application Great Britain, June 3, 1966, 24,785/66
Int. Cl. H03b *19/00;* H03k *4/02*
U.S. Cl. 328—14                                1 Claim

ABSTRACT OF THE DISCLOSURE

A digital waveform generator for synthesizing a digital waveform having only the fundamental and prescribed harmonic components present. A basic waveform having a repetitive signal of period T is added to an identical signal delayed in time by an amount $T/2x$ where $x$ is an integer. The resulting waveform will have the $x$th harmonic component eliminated by successively repeating the summation step using in each case the resulting waveform from the preceding summation step as the basic waveform and adding to it an identical waveform delayed in time by an amount $T/2y$ where $y$ is an integer and representative of the harmonic component to be eliminated.

The invention relates to a method of synthesizing a digital waveform having only the fundamental and prescribed harmonic components present and to digital waveform generators for producing same, the generated waveforms having particular but not necessarily exclusive application to time domain modulators and filters.

In many applications, particularly in the field of modulation and multipath time domain techniques it is required that digital wave forms be generated which have prescribed harmonics missing.

The present invention provides a method of synthesizing a digital waveform having only the fundamental and prescribed harmonic components present which includes the steps of providing a first repetitive signal of fundamental period T which is used as the basic waveform, and a second identical repetitive signal delayed in time with respect to said first repetitive signal by an amount $T/2x$, where $x$ is an integer, adding said first and second repetitive signals to provide a resulting waveform having the $x$th harmonic component eliminated, wherein any further harmonic components may be eliminated by successively repeating the summation step using in each case the resulting waveform from the preceding summation step as the basic waveform and adding to it an identical waveform delayed in time by an amount $T/2y$ where $y$ is an integer and representative of the harmonic component to be eliminated.

The foregoing and other features according to the invention will be understood from the following description with reference to the accompanying drawings, in which:

FIG. 1 shows a square waveform which comprises a series of repeated pulses of period T;

FIG. 2 shows the resulting waveform when the waveform shown in the drawing according to FIG. 1 is added to a similar waveform delayed in time by an amount $T/2x$ where $x$ is equal to two;

FIG. 3 shows the resulting waveform when the waveform shown in the drawing according to FIG. 2 is added to a similar waveform delayed in time by an amount $T/6$;

FIG. 4A shows the waveform shown in the drawing according to FIG. 3 but having pulses $T/12$ wide;

FIGS. 4B and 4C show the waveform shown in the drawing according to FIG. 4A respectively delayed in time by the amounts $T/3$ and $2T/3$;

FIG. 6 shows a block diagram of a typical digital waveform generator used to produce the waveform illustrated in the drawings according to FIG. 3 and FIGS. 4A to 4C.

FIG. 11 shows a block diagram of an N-path configuration of a frequency translation system;

Figure 5:
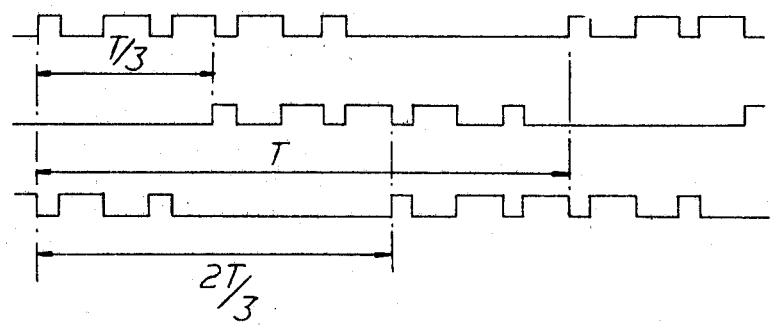
FIG. 5 shows a similar set of curves to the ones shown in the drawings according to FIGS. 4A to 4C except the fourth harmonic as well as the second and third harmonics have been removed.

Referring to FIG. 1, a two level waveform i.e. a square waveform which switches between the limits zero to $+1$, is shown and comprises a series of repeated pulses of period T.

If an identical waveform having a series of repeated pulses, delayed in time with respect to the waveform shown in the drawing according to FIG. 1 by an amount $T/2x$ where $x$ is an integer, is added to the waveform shown in the drawing according to FIG. 1 then the resulting waveform will have the $x$th harmonic cancelled out. If $x$ the integer is made equal to two then the second harmonic component will be cancelled out as shown in the drawing according to FIG. 2.

Similarly, if the integer $x$ had been made equal to three then the third harmonic would have been eliminated.

If the waveform shown in FIG. 2 delayed in time by an amount $T/2y$ where $y$ is an integer is added to the waveform shown in FIG. 2 then the $y$th harmonic will also be cancelled out as shown in the drawing according to FIG. 3 where $y$ is equal to 3.

Mathematical analysis shows that not only the $x$th harmonic but also the $3x$th, $5x$th, $7x$th etc. harmonics are also eliminated. Similarly, for $3y$, $5y$ etc.

This process may be repeated several times using waveforms displaced in time by an amount which is representative of the particular harmonic it is required to eliminate i.e. giving the integer $x$ a numerical value equal to the particular harmonic it is required to cancel.

The individual pulses may have any pulse width but if the pulse width exceeds $T/12$ in this example, they will overlap one another and produce a three level waveform.

If the pulses are made exactly $T/12$ wide then the waveform shown in the drawing according to FIG. 3 will be transposed to the waveform shown in the drawing according to FIG. 4A. The pulses 13 and 14 which form part of the waveform shown in the drawing according to FIG. 3 are merged into the pulse 15 shown in the drawing according to FIG. 4A.

FIGS. 4B and 4C show the waveform illustrated in the drawing according to FIG. 4A respectively delayed in time by the amounts $T/3$ and $2T/3$. It will be observed that the fundamental components of these three waveforms are in three-phase with one another and that the three waveforms sum to unity. The last mentioned property is very useful in multipath modulators and filters.

Referring to FIG. 5, a similar set of curves to the ones shown in the drawings according to FIGS. 4A to 4C are shown in which the fourth harmonic component has also been removed. A similar set of curves may be derived with the fifth harmonic removed but this presents a more complex problem since it is found that when the process is completed and the pulses have been made as wide as possible without overlap the three waveforms do not sum to unity. In this instance it is necessary to add to each of the waveforms a further waveform whose fundamental is eight times that of the basic waveform fundamental. The resultant waveforms will then sum to unity and the basic pulse to generate this is only six degrees wide.

Referring to FIG. 6, a block diagram of a typical digital waveform generator used to produce the waveform illustrated in the drawings according to FIG. 3 and FIGS. 4A to 4C is shown and comprises a generator unit 16, delay lines 5, 7 and 8, and summation units 6 and 9.

The output from the generator unit 16 which, in the examples given above, would provide the basic waveform shown in the drawing according to FIG. 1, is passed to the summation unit 6 and to the delay unit 5. The output from the delay line 5 which is the generated waveform delayed in this instance by an amount $T/4$ is passed to the summation unit 6 where it is summed with the basic waveform to produce at the output of the summation unit 6 the waveform shown in the drawing according to FIG. 2.

The output from the summation unit 6 is passed to the summation unit 9 and to the second delay line 5 where it is delayed by an amount $T/6$ before being passed to the summation unit 9.

The output 10 from the summation unit 9 would be exactly the same as the waveform shown in the drawing according to FIG. 3.

As previously stated the waveforms shown in the drawings according to FIG. 3 and FIG. 4A are the same except the width of the pulses is different therefore if we had originally started with a basic waveform of pulse width $T/12$ then the output 10 from the summation unit 9 would be as shown in the drawing according to FIG. 4A.

In order to obtain the waveforms shown in the drawings according to FIGS. 4B and 4C the output from the summation unit 9 is passed to another delay line 8, the outputs 11 and 12 of which are respectively delayed by the amounts $T/3$ and $2T/3$.

Figure 7:
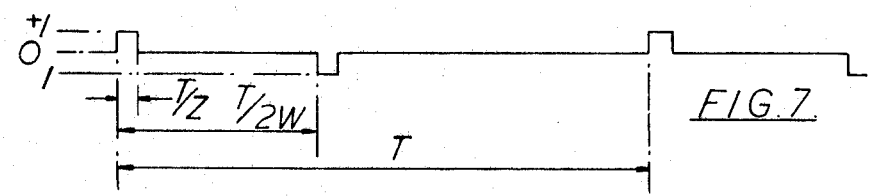
FIG. 7 shows a three level waveform which comprises a series of negative and positive going repeated pulses of period T.

It is found in practice that a very useful class of waveforms are those which switch between the limits $-1$, $0$ and $+1$, i.e. three level waveforms, and are symmetrical about the zero line. A three level waveform is shown in the drawing according to FIG. 7 and the negative and positive going pulses have a period of $T/2W$ and a pulse width of $T/Z$.

Figure 8:
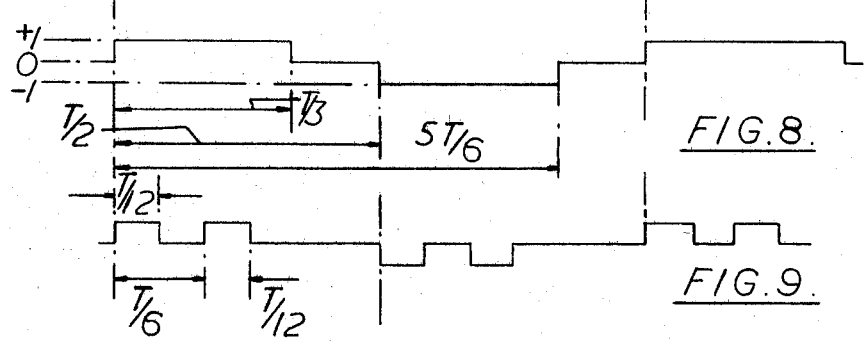
FIG. 8 shows the waveform shown in the drawing according to FIG. 7 but having pulses $T/3$ wide and the negative pulses delayed in time with respect to the positive pulses by an amount $T/2$.

If Z equals three and W equals one then the waveform shown in the drawing according to FIG. 8 is obtained. In this waveform all even harmonics including the D.C. term are missing as are the 3rd, 6th, 9th, 12th etc. Only the 1st, 5th, 7th and 11th etc. are present.

Figure 9:
FIG. 9 shows the resulting waveform when the waveform shown in the drawing according to FIG. 7 having Z equal to 12 and W equal to unity is added to a similar waveform delayed in time by an amount $T/6$.

If Z equals 12 and W equals one and a similar waveform delayed by an amount $T/6$ is added to it then the waveform shown in the drawing according to FIG. 9 is obtained. In this waveform all even harmonics are eliminated as are the 3rd, 9th, 15th, 21st etc.

Referring to FIGS. 10A to 10E the sequence of building up a nine level waveform with up to and including the 10th harmonic eliminated is shown.

Figure 10A:
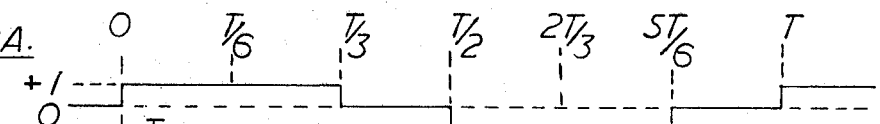
FIGS. 10A to 10E show the sequence of building up a nine level waveform with up to and including the tenth harmonic eliminated.
Figure 10B:
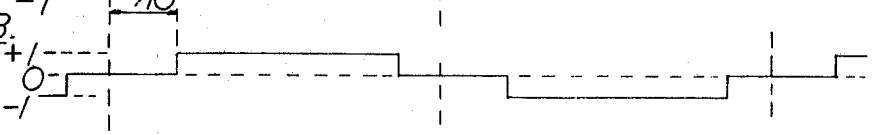

FIG. 10A shows the waveform shown in the drawing according to FIG. 8 and FIG. 10B shows this waveform delayed in time by an amount $T/10$.

Figure 10C:
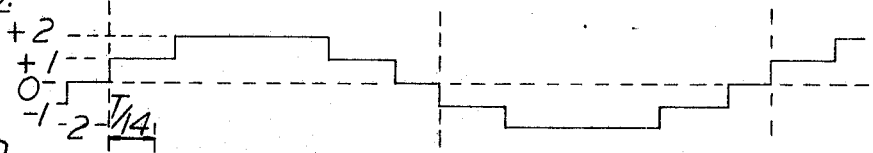

FIG. 10C shows the addition of the waveforms shown in the drawings according to FIGS. 10A and 10B in which the 5th, 15th, 25th, 35th etc harmonics are eliminated as well as the ones already missing from the waveform shown in the drawing according to FIG. 10A.

Figure 10D:
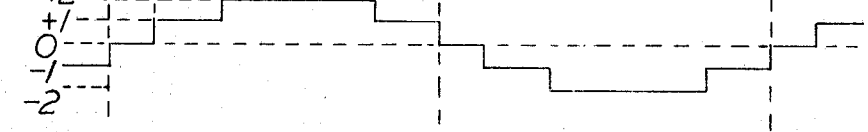
Figure 10E:
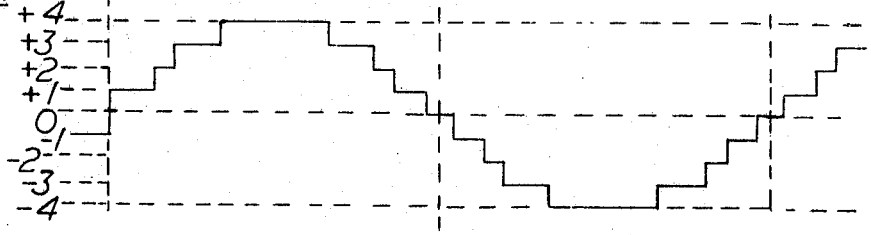

FIG. 10D shows the waveform shown in the drawing according to FIG. 10C delayed in time by an amount $T/14$ and FIG. 10E shows the resultant of these two waveforms after addition. In this waveform only the fundamental and the 11th, 13th, 17th, 19th, 23rd, etc. harmonics are present.

Multilevel waveforms are superior to two level waveforms since each time a further harmonic is eliminated the relative amplitude of the fundamental component compared with the remaining harmonics increases. In the limit a pure sine wave is produced.

In two level waveforms the pulses have to be made narrower and narrower in order to eliminate the higher harmonics and to avoid overlap thus reducing the fundamental content.

It should be noted that the basic waveform need not necessarily be of rectangular form, the mathematics associated with this synthesis technique can be completely generalized to allow for repeated waveforms of any shape, for example, they could be triangular or even semi-sinusoidal.

Referring to FIG. 11 a block diagram of the N-path configuration of a frequency translation system is shown, each path of which comprises a modulator unit 1 at a frequency $f_1$ which is the midband frequency of the input band of frequencies, a low pass filter unit 2 whose cut-off frequency is half the desired system bandwidth and a second modulator unit 3 at a frequency $f_2$ which is the midband frequency of the output band frequencies. The modulator units 1 and 2 being unbalanced.

This system is arranged to select a band of frequencies from a given input spectrum and to translate it either erect or inverted to a new frequency band, i.e. the output frequency band as obtained from the summation unit 4.

Considering only one path of the N-path system, the output signal is sampled by and passed through the input modulator unit 1. This modulator unit has a square wave signal applied to it so there will be a large number of frequency components appearing in the output circuit of the input modulator unit 1 but the only one of interest is the difference frequency between the input and modulator frequencies. Thus the output from the low pass filter unit 2 will be a single low frequency signal which is demodulated by the output modulator unit 2 before being passed to the summation unit 4.

All of the N-paths are physically identical and the modulator frequencies $f_1$ and $f_2$ have exactly the same waveform, the only difference being that the modulator frequencies $f_1$ and $f_2$ are each delayed in time, i.e. each of the modulator frequencies $f_1$ and $f_2$ is delayed by $T/N$ on the previous one, where N is the total number of paths and T is the period of oscillation.

It is normal in these systems to arrange some band limiting of both the input and output due to the fact that the output consists of an infinite spectrum of products and of course, there will be a response for an infinite range of input signals.

The band limiting restrictions depend on the number of paths and the width of the band that it is desired to translate.

The response of an N-path filter or modulator is defined by $$V_0(p) = N \sum_{\substack{L=-\infty \\ K=-\infty}}^{\substack{K=+\infty \\ L=+\infty}} \{(-1)^m X_L X_K H(p-Lp_1) V_i(p-Lp_1-Kp_2)\} \quad (1)$$

with $K+L=mN$    $p_1=j2\pi f_1$    $p_2=j2\pi f_2$
where $V_0(p)$ is the output response for an input $V_1(p)$.
N is the number of paths.
$m$ is an integer.
$X_L$ is the Fourier Coefficient of the Lth term in the Fourier expansion of the input modulator multiplying function for path number one.
$X_K$ similarly for the output modulator.
$H(p)$ is the low pass filter voltage transfer function.
$f_1$ and $f_2$ are the input and output modulator switching frequencies.

If the output of the modulator is band limited such that only frequencies corresponding to $K=\pm 1$ reach the output then the spectrum will be limited to components of the form $V_1(p-Lp_1\pm p_2)$, i.e., of frequency $$f-Lf_1\mp f_2$$

with $L=mN\mp 1$.

In a three path modulator for example L can take the values . . . $-10, -8, -7, -5, -4, -2, -1, +1, +2, +4, +5, +7, +8$ . . . etc.

Ideally, the low pass filters will cut off at $f_1$ and pass frequencies below $f_1$ only. This means that the difference frequencies produced by the input modulator are limited such that $$0<|f-Lf_1|<f_1$$

Therefore for the 3 path modulator for $L=1$ an input in the band $0-2f_1$ will give a response
$L=2$ an input in the band $f_1-3f_1$ will give a response
$L=4$ an input in the band $3f_1-5f_1$ will give a response
etc.

In the example quoted only the response corresponding to $L=+1$ is required. All other responses are unwanted and must somehow be eliminated. If a low pass filter is interposed between the source and the input to the modulator and the filter has a passband up to $2f_1$ and stops all frequencies beyond $2f_1$ then only the response due to $L=+1$ and part of the response due to $L=+2$ will present.

If in addition the input modulator switching function is arranged to contain no second harmonic then $$[X_L]_{L=2}=0 \text{ and } [V_0(p)]_{L=2}=0$$

There will then be no response for $L=2$. The band limiting low pass filter at the input can be made slightly simpler now since signals in the band $2f_1$ to $3f_1$ will give no response. The filter cut off can be made much more gradual, starting at $2f_1$ and providing the full stop band loss at $3f_1$.

The process can be extended by also eliminating the 4th harmonic when there will be no response for input signals in the range $2f_1$ to $4f_1$ which will relax the input low pass requirements even further.

Bandlimiting requirements at the output of the modulator can also be relaxed if for example 2nd harmonic is removed from the output switching function.

For the three path modulator the synthesized waveforms shown in the drawing according to FIGS. 4A to 4C which have both the 2nd and 3rd harmonies absent are therefore ideal for the modulator switching function since they are delayed in time relative to each other by an amount $T/3$.

As previously stated the useful property of the waveforms illustrated in the drawings according to FIGS. 4A to 4C is that they sum to unity at all times. Also, only one waveform takes the value unity at any instant while the other two take the value zero.

If the three waveforms represent the states of three switches, unity representing a closed switch and zero an open circuit switch then one and not more than one switch is closed at all times. This finds applications in both the N path filter or modulator and the R=C digital filter.

In the modulator it has been found advantageous to drive the filters in the N paths, each through a series switch from a constant current source. The use of switching waveforms as above ensures that the current generator always sees one and only one path at all times.

Figure 12:
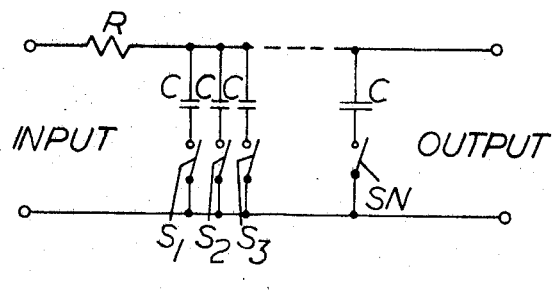
FIG. 12 shows the circuit diagram of an R.C. digital filter.
Figure 13:
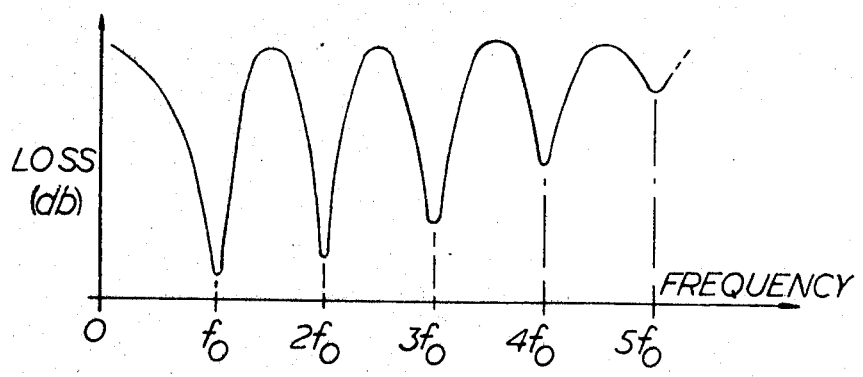
FIG. 13 shows the characteristic of the digital filter shown in the drawing according to FIG. 12.

In the R-C digital filter which is a special case of the N path filter, N capacitors C bridge a line each via a switch S1, S2, S3 . . . SN. This is shown in the drawing according to FIG. 12. Normally, switch S1 closes for a period $T/N$ and then opens. Then switch S2 closes for a period $T/N$ and then opens followed by switch S3 and so on. Finally switch SN opens and the cycle repeats with switch S1. This results in a comb band-pass filter characteristic as shown in the drawing according to FIG. 13 and it may be that all the pass bands so obtained apart from the lowest one are not wanted. In this case band limiting must be applied in the form of filters at both input and output.

By using the waveforms described in the preceding paragraphs, with say the 2nd and 3rd harmonic removed the 2nd and 3rd pass bands may be removed making the task of band limiting much easier. Since it is essential for the correct operation of such a filter that only one capacitor bridges the line at any instant and that at no time is there a condition where there is no load across the line the waveforms shown in the drawings according to FIGS. 4A and 4B and FIG. 5 may be used.

By using the synthesized waveforms to perform the modulator switching function considerable economies can be effected in the band limiting filters required for say the N-path filter or modulator and the R-C digital filter because without these waveforms the construction of the filter in, for example, thin film R-C form would be difficult and expensive in the present state of the art.

Also, by using these synthesized waveforms the filter can be reduced to a simple passive R-C type giving a saving in both expense and physical dimensions.

It is to be understood that the foregoing description of specific examples of this invention is made by way of example only and is not to be considered as a limitation on its scope.

We claim:
1. A method of synthesizing a digital waveform having only the fundamental and prescribed harmonic components present which includes the steps of providing a first repetitive signal of fundamental period T which is used as the basic waveform, and a second identical repetitive signal delayed in time with respect to said first repetitive signal by an amount $T/2x$, where $x$ is an integer, adding said first and second repetitive signals to provide a resulting waveform having the $x$th harmonic component eliminated, wherein any further harmonic components may be eliminated by successively repeating the summation step using in each case the resulting waveform from the preceding summation step as the basic waveform and adding to it an identical waveform delayed in time by an amount $T/2y$ where $y$ is an integer and representative of the harmonic component to be eliminated.

References Cited

UNITED STATES PATENTS 2,848,616   8/1958   Tollefson _____ 328—156 XR
3,184,685   5/1965   Funk et al. _____ 328—61
3,249,879   5/1966   Ward et al. _____ 328—156 XR DONALD D. FORRER, Primary Examiner J. ZAZWORSKY, Assistant Examiner U.S. Cl. X.R.

328—27, 165, 186, 187